(12) United States Patent
Mahalanabis

(10) Patent No.: US 8,874,501 B2
(45) Date of Patent: Oct. 28, 2014

(54) SYSTEM AND METHOD FOR DATA AGGREGATION, INTEGRATION AND ANALYSES IN A MULTI-DIMENSIONAL DATABASE

(71) Applicant: Tata Consultancy Services Limited, Mumbai (IN)

(72) Inventor: Suman Mahalanabis, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 13/680,655

(22) Filed: Nov. 19, 2012

(65) Prior Publication Data

US 2013/0138601 A1     May 30, 2013

(30) Foreign Application Priority Data

Nov. 24, 2011   (IN) .......................... 3310/MUM/2011

(51) Int. Cl.
    *G06F 17/00*       (2006.01)
    *G06F 7/00*        (2006.01)
    *G06F 17/30*       (2006.01)

(52) U.S. Cl.
    CPC ................................ *G06F 17/30563* (2013.01)
    USPC ................ 707/600; 707/602; 706/46; 706/48

(58) Field of Classification Search
    CPC .......... G06F 17/30539; G06F 11/3664; G06F 17/30592; G06F 11/3409; G06F 17/3089
    See application file for complete search history.

(56) References Cited

U.S. PATENT DOCUMENTS

| | | | |
|---|---|---|---|
| 7,444,342 B1 * | 10/2008 | Hall et al. ............................. | 1/1 |
| 8,285,576 B2 | 10/2012 | Friedlander et al. | |
| 2005/0071737 A1 | 3/2005 | Adendorff et al. | |
| 2006/0089939 A1 * | 4/2006 | Broda et al. .................. | 707/100 |
| 2007/0168228 A1 * | 7/2007 | Lawless ........................... | 705/2 |
| 2009/0055439 A1 * | 2/2009 | Pai et al. ...................... | 707/200 |
| 2010/0287106 A1 | 11/2010 | Halkus et al. | |
| 2011/0208691 A1 | 8/2011 | Liu | |

\* cited by examiner

*Primary Examiner* — Angelica Ruiz
(74) *Attorney, Agent, or Firm* — Schmeiser, Olsen & Watts LLP

(57) ABSTRACT

The present invention relates to a system and method for flexibly integrating a data warehouse with one or more operational database in real-time. The system comprises of a plurality of components embedded under one or more layers. The system comprises of a staging database, an ETL (extract transform load) module, a data warehouse and a networking module. The flexible integration is enabled by invoking one or more web services from a business enterprise. The invention further provides one or more analytical modules for performing an intelligent operation to carry out comparative analysis of the data. The designing and implementation module enables a deployment of the system on any related technology platform and tools.

14 Claims, 2 Drawing Sheets

SYSTEM AND METHOD FOR DATA AGGREGATION, INTEGRATION AND ANALYSES IN A MULTI-DIMENSIONAL DATABASE

CROSS REFERENCE TO RELATED APPLICATION[S]

This application claims priority to Indian Patent Application to Mahalanabis, serial number 3310/MUM/2011, filed Nov. 24, 2011, the disclosure of which is hereby incorporated entirely herein by reference.

FIELD OF INVENTION

The invention relates to a system and method for providing an end-to-end business intelligence platform with prebuilt analytics and industry benchmarks specific to the business needs of the one or more industries. More particularly, the invention relates to the aggregation of data elements from operational systems in a multi-dimensional data base to provide analytical tools for performing analyses related to one or more industries.

BACKGROUND OF THE INVENTION

Today's industrial development has made a rapid growth by meeting the current requirements of almost every sector of the society. Most developed industries including the communication industry, high tech industries, equipment industries and others have made a high jump in terms of technology advancement. With increased competition all these industries are now more focused towards the pre analyses of customer's requirements and aligning their operational processes to those. This focus on customer centricity is required to differentiate their products and services and excel in customer experience. With the constant shift in industry dynamics, organizations need to focus on new opportunities, key result areas (KRAs) and key performance indicators (KPIs) to stay ahead of the competition and as businesses have expanded, and the complexities in operational systems have also grown manifold leading to challenges in getting a uniform view of the organization across the common KPIs and KRAs. With the increasing data volumes from multiple systems, all these industries have to be more and more vigilant in checking the overall performance of the decision making system while reducing the probability of risk and loss.

Data warehousing, the creation of an enterprise wide data source, is the first step towards managing the large volumes of customer related data. The data warehousing is becoming an integral part of many information delivery systems because it provides a single, central location where a reconciled version of data extracted from a wide variety of operational source is stored for performing analyses. There are a number of existing solutions that provide generic data warehouse and analytical capabilities. Current solutions do not provide an industry specific prebuilt analytics that are pre-integrated with a data warehouse and a data services solution. This pre-integrated solution can cater to end to end business intelligence (BI) needs of the organizations in collating information across the enterprise to provide analytics and at the same time provide real time access of these analytics to operational systems. Current solutions also do not provide such pre-integrated analytics in the business areas of subscriber network experience, product portfolio performance, churn-out analytics, retail store performance, dynamic brand sentiment measurement, etc. In absence of such pre-integrated solutions, organizations currently are incurring additional costs and time in building similar functionalities.

Therefore, there is a need of a system which is capable of providing support for business analyses and intelligent operations through integration with rules engine and operational processes. The system should also be flexible in terms of service model implementation and maintenance.

OBJECTS OF THE INVENTION

It is the primary object of the invention to build an end to end business intelligence solution with pre-integrated analytics, data warehouse and data services for one or more industries.

It is another object of the invention to provide various prebuilt analytical tools specific to the emerging needs of the industry for performing analyses in areas like subscriber network experience, product portfolio performance, churn-out analytics, retail store performance, dynamic brand sentiment measurement, etc.

It is yet another object of the invention to provide a comparison of performance with respect to the benchmarked KPI's (key performance indicators) in one or more industry.

It is yet another object of the invention to support intelligent operations by integrating the data warehouse with the operational system through data services.

It is yet another object of the invention to provide this pre-integrated solution in a technology agnostic manner where the same designs can be implemented across different tools and technologies.

It is yet another object of the invention to provide flexibility in one or more components to add new business rules or services.

SUMMARY OF INVENTION

The present invention provides a system for flexibly integrating a data warehouse with one or more operational database in real-time such that a first node communicatively accessing one or more data elements from one or more disparate databases installed at a plurality of disparate computing environment. The system comprises of an extracting module for extracting a data from one or more disparate databases and a staging database configured for correlating and accumulating the data for supporting a mining of a transactional data out of the data. The correlated data is further processed through an extraction transformation and load routine for loading it onto the data warehouse. The data warehouse is configured for storing the data in a summarized form. The system further comprises of a networking module configured to enable the flexible integration of the data warehouse with the one or more operational systems and enterprise processes to support real time sharing of data from the data warehouse to the connected operational systems and enterprise processes and one or more analytical module communicatively coupled to the data warehouse for performing an intelligent operation to provide an insight into a customer's behavior and business performance of one or more industries by enabling a comparative analyses with respect to the data. The system further comprises of one or more designing and implementing module configured for enabling a deployment of the system on any related technology platform and tools.

The present invention also provides a method for flexibly integrating a data warehouse with one or more operational database in real-time such that a first node communicatively accesses one or more data elements from one or more disparate databases installed at a plurality of disparate computing environment. The method comprises of a processor implemented steps of extracting one or more data element of a customer from one or more disparate databases, correlating and accumulating the data for supporting a mining of a transactional data out of the data and processing the data through extraction transformation and load routine for loading it onto the data warehouse for obtaining the data in a summarized form. The method further comprises of flexibly integrating the data warehouse with the one or more operational system and an enterprise process and supporting real-time sharing of the data from a data warehouse to the connected operational system and enterprise process and connecting a plurality of disparate databases and computing environments by instantaneously invoking one or more web services from one or more data elements. The method further comprises of providing an insight into a customer's behavior and business performance of one or more industries by enabling a comparative analyses with respect to the said query data.

DETAILED DESCRIPTION OF THE INVENTION

Some embodiments of this invention, illustrating its features, will now be discussed:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by the processor or any other hardware entity. Further a module may be incorporated with the set of instructions or a programme by means of an interface.

The disclosed embodiments are merely exemplary of the invention, which may be embodied in various forms.

The present invention provides a system and method for enabling a flexible integration of a data warehouse with one or more operational database in real-time. The system and method consists of a first node communicatively accessing one or more data elements from one or more disparate databases installed at a plurality of disparate computing environment. The system and method extracts data from a plurality of disparate databases and performs an intelligent operation in order to provide an insight into a customer's behavior and business performance of one or more industries by enabling a comparative analysis with respect to the query.

Figure 1:
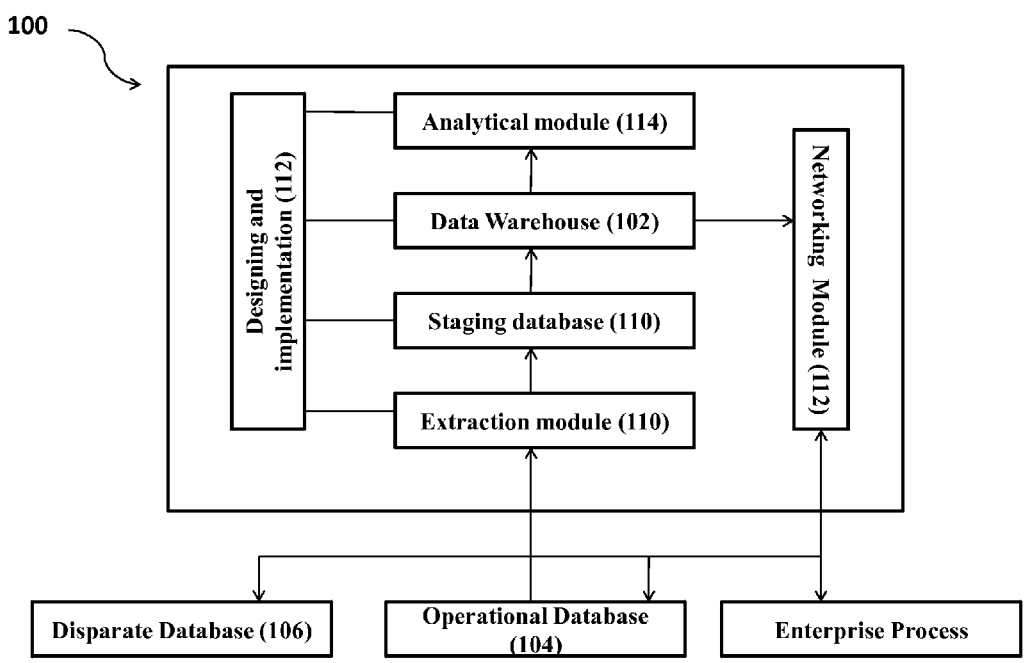
FIG. 1 illustrates the architecture view of the system in accordance with an embodiment of the invention.

In accordance with an aspect, referring to FIG. 1, the system (100) provides a flexible integration of a data warehouse (102) with one or more operational database (104). The system (100) comprises of a disparate database (106) from which data is extracted. This data may be in a form of a query of a customer. The system (100) further comprises of an extracting module (108) which is adapted to extract data from one or more disparate databases (106), a staging data base (110) for correlating and accumulating the data, a networking module (112) for enabling a flexible integration, one or more analytical module (114) for performing a comparative analyses and a designing and implementing module (116) for enabling a flexible deployment of the system (100) on any related technology platform and tools.

The one or more disparate databases (106) provide customer related data. These disparate databases (106) may be corporate systems or operational system or a combination thereof and provide data which may include and is not limited to a customer relationship management data, data related to orders, billing data, network performance data, mediation data or a combination thereof.

The extracting module (108) is an ETL (Extract Transform Load) module and processes the data for performing an analysis. The first layer is a staging layer. In this layer, the data extracted from the disparate databases (106) is passed to the staging database (110). The staging database (110) stores predefined table structures in a predefined format. The table structures of the staging database (110) guides the development of routines for extraction, transformation and loading of data from multiple disparate databases (106). The staging database (110) also performs a validation check of the data extracted from the disparate databases (106).

The staging database (110) is further configured to correlate and accumulate the data. Out of the data of the customer, a transactional data is extracted. The staging database (110) supports a mining of the transactional data. The correlated data is then extracted by the extracting module (108) and is loaded onto the data warehouse (102). This data warehouse (102) may be an enterprise data warehouse.

Figure 2:
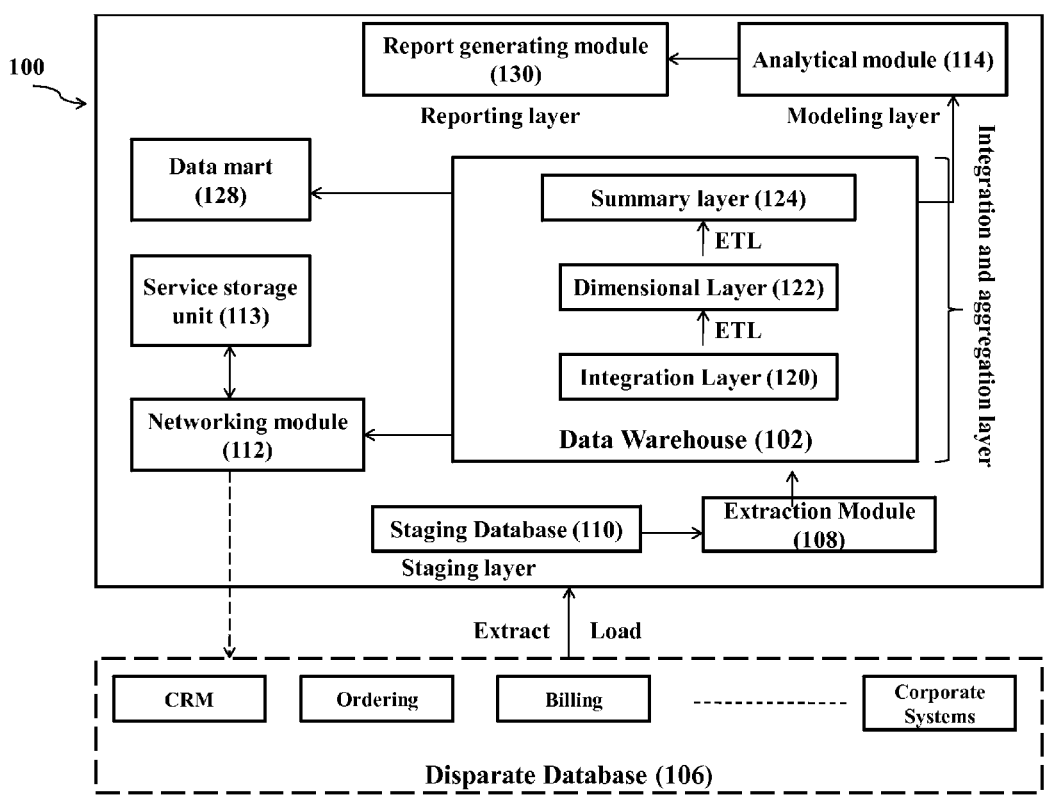
FIG. 2 illustrates the one or more system components and the flow of process in accordance with an alternate embodiment of the invention.

Referring to FIG. 2, the data warehouse (102) is constructed in the form of one or more layers. The extraction module (108) passes the validated data to the integration layer (120). Here the data is integrated with one or more dimensions. These dimensions may include and is not limited to products, customers, subscribers, devices, billing and usage details or a combination thereof. The integrating layer provides an operational reporting. By way of a specific example, this integration layer (120) is provided with one or more data model integrated with pre-built analytics.

The extraction module (108) further passes this integrated data to a dimensional layer (122). Various dimensional data like customers, subscriptions, towers, products, recharges, vendors, campaign, call centers or a combination thereof is loaded in this layer. This layer consists of confirmed and non-confirmed dimensions. The integrated data is loaded separately for each subject area. The subject area includes product usage, customer churn, network subscriber experience etc. All the necessary calculations are performed under the dimensional layer (122).

The data from dimensional layer (122) is further aggregated and loaded into a summary layer (124). The loading is performed by the extraction module (108). The data is aggregated with respect to the granularity of various dimensions like customer, product, subscript, tower etc. The aggregation is performed for a predetermined time period which may be a day, a month etc. The summary layer (124) performs the calculations related to the reporting as per the timely requirement.

In accordance with an embodiment, referring to FIG. 1, the system (100) further comprises of the networking module (112) configured to enable the flexible integration of the data warehouse (102) with one or more operational databases (104). The networking module (102) enables the flexible integration by invoking one or more web services from one or more business enterprise. The web services support a real-time sharing of the data warehouse (102) to the connected operational system and the enterprise processes. These web services are also capable of sending an alert in case any of the service crosses a prebuilt KPI (key performance indicator).

The system (100) further comprises of a service storage unit (113) for storing one or more data services which are used to enable the integration of the data warehouse (102) to the operational database (104). The data services are written on open technology like XML, web services or combination thereof. The operational database (104) further comprises of one or more modules for enabling service operation analyses, financial performance and strategy management analyses, sales and revenue management analyses, network experience analyses, enterprise performance analyses or a combination thereof. By way of specific example, the operational database (104) also provides retail store performance, supply chain, telecom operations, finance and revenue assurance or a combination thereof.

When the data is summarized it will be further used for analysis. One or more analytical modules (114) are configured for performing the analyses of the data. This analytical module (114) will store prebuilt dashboards, KPI (key performance indicators), reports etc for doing the analyses of the data. This analysis is performed under modeling layer. The analytical modules (114) includes one or more data models for performing analyses which include and are not limited to sales model, marketing model, customer model or a combination thereof. The analytical module (114) is flexible in accepting one or more new business rules or KPI (key performance indicators).

In accordance with an embodiment, by way of specific example, the analytical module (114) may perform analyses related to communication industry. These analyses may be on subscriber's network experience, product performance correlating subscriber profile with usage, churn-out patterns against subscriber profiles etc.

In accordance with an embodiment, the additional analytical areas may include and are not limited to device analytics, machine-to-machine analyses, LBS (location based analyses), video analyses or a combination thereof. Also, by way of another example, the analyses may be extended to prepaid analyses which provide results for prepaid services in communication industry.

In accordance with an embodiment, referring to FIG. 2, the system further comprises of one or more report generating module (130) configured for generating one or more analytical reports with respect to the analysis performed by the analytical module (114). By way of a specific example, the generated report may be a mining report, campaign management report, adhoc report, standard reports analytics report etc. The reports are generated under the report layer. Also, the report generating module (130) is flexible in adding new business rules and/or KPI's. The generated report will also provide also provide a comparison of performance with respect to the benchmarked KPI's (key performance indicators) in one or more industry.

Again referring to FIG. 2, the system (100) further comprises of a data mart (128) which stores the historical data for carrying out the predictive analyses which include and is not limited to customer insight, social analytics, and content analytics location based analytics, device analytics or a combination thereof.

Referring to FIG. 2, the system (100) further comprises of a designing and implementing module (116) configured for enabling deployment of the system (100) or one or more components of the system (100) on any related technology and platform tools such that the system (100) can be integrated with any of the data base for providing overall analyses of one or more industries. The system is adaptive in nature so that it can add or accept new service tools to address the current requirements of one or more industries. Also, the system (100) can operate by using any of the technology for example oracle. The system is modular in nature and provides flexibility to the customer to access any service or component from the system as per the requirement of the customer.

BEST MODE/EXAMPLE FOR WORKING OF THE INVENTION

The process illustrated for a flexible integration of the data warehouse with the one or more operational database may be illustrated by a working example showed in the following paragraph; the process is not restricted to the said example only:

In a call center scenario, one or more agent may receive a call from one or more customers for seeking some information. While responding to the query of the customer, the agent may need to know about the quality of the customer whether the customer is a privileged customer or a paying customer etc. and also refer to some detailed information like the customer's service usage patterns, billing trend, most preferred locations, quality of services, etc. Some of the information may be stored in the agent's database while for obtaining the detailed information; the agent can retrieve the data in real time from the data warehouse by invoking the web services where the correlated data from multiple sources is available in a refined and summarized form. The agent may also refer to the prebuilt analytical reports on the refined data from the data warehouse to obtain the best possible information about the customer. These reports may also be shared with the customers through the integration of the data warehouse with email systems of the call center. Similar integration through web services for real time inputs and other modes like batch extracts, reports caching etc. for offline data referral may also be made available to the customer self service websites or sent proactively to customers for availing detailed information on the relevant data as required.

The preceding description has been presented with reference to various embodiments. Persons skilled in the art and technology to which this invention pertains will appreciate that alterations and changes in the described structures and methods of operation can be practiced without meaningfully departing from the principle and scope.

I claim:

1. A system for providing an insight into a customer's behavior and business performance of one or more industries based on data stored in one or more disparate databases, the system comprising:

an extracting module for extracting the data from the one or more disparate databases;

a staging database configured for correlating the data with one or more dimensions associated to a customer, wherein the data is correlated by using
  a) a pre-defined table structure stored in the staging database, and
  b) an extraction transformation and load routine,
and wherein the one or more dimensions comprise product usage patterns, billing trends, preferred locations, and a quality of service;
the data warehouse configured to store the data in a summarized form, wherein the data warehouse comprises an integration layer, a dimensional layer, and a summary layer, and wherein the integration layer integrates the data with the one or more dimensions being correlated, and wherein the dimensional layer stores the data being integrated, and wherein the data corresponds to subject areas comprising product usage, customer churn, and subscriber experience, and wherein the summary layer stores the data in the summarized form for a predetermined time period;
a networking module configured to integrate the data warehouse with one or more operational databases and enterprise processes to support real time sharing of the data, stored in the data warehouse, to the one or more operational databases and enterprise processes; and
an analytical module communicatively coupled to the data warehouse for performing an analytical operation on the data thereby providing the insight into the customer's behavior and business performance of the one or more industries.

2. The system as claimed in claim 1, wherein the extracting module is an ETL (extract transform load) module.

3. The system as claimed in claim 1, wherein the analytical module further comprises of one or more data models for performing the analyses of the data, wherein the one or more data models includes a sales model, a marketing model, a customer model or a combination thereof.

4. The system as claimed in claim 1, wherein the analytical module further comprises prebuilt dashboards, scorecards, benchmarks, KPI's (Key Performance Indicator), prebuilt reports specific to the one or more industries for enabling the comparative analyses of the data.

5. The system as claimed in claim 1, wherein the system further comprises of a report generating module configured to generate one or more analytical report representing the comparative analyses.

6. The system as claimed in claim 1, wherein the system further comprises of a data mart for storing a historical data for performing a predictive analyses.

7. The system as claimed in claim 1, wherein the networking module is further configured to invoke one or more web services for integrating the data warehouse with the one or more operational databases.

8. The system as claimed in claim 1 further comprising a storage unit for storing the one or more web services.

9. The system as claimed in claim 1, wherein the networking module is further configured to transmit an alert with respect to the performed analyses when the one or more web services crosses a prebuilt KPI (Key Performance Indicator).

10. A method for providing an insight into a customer's behavior and business performance of one or more industries based on data stored in one or more disparate databases, the method comprising a processor implemented steps of:
  extracting the data from the one or more disparate databases;
  correlating the data with one or more dimensions associated to a customer, wherein the data is correlated by using
    a) a pre-defined table structures, stored in a staging database, and
    b) an extraction transformation and load routine,
  and wherein the one or more dimensions comprise product usage patterns, billing trends, preferred locations, and a quality of service;
  storing the data in the data warehouse in a summarized form, wherein the data warehouse comprises an integration layer, a dimensional layer, and a summary layer, and wherein the integration layer integrates the data with the one or more dimensions being correlated, and wherein the dimensional layer stores the data being integrated, and wherein the data corresponds to subject areas comprising product usage, customer churn, and subscriber experience, and wherein the summary layer stores the data in the summarized form for a predetermined time period;
  integrating the data warehouse with one or more operational databases and an enterprise processes to support real-time sharing of the data, stored in the data warehouse, to the one or more operational databases and the enterprise processes; and
  performing an analytical operation the data thereby providing the insight into the customer's behavior and business performance of the one or more industries.

11. The method as claimed in claim 10, wherein the data warehouse is integrated with the one or more operational databases by invoking one or more web services.

12. The method as claimed in claim 10, wherein the analyses of the data is performed based on one or more data models, wherein the one or more data models includes a sales model, a marketing model, a customer model or a combination thereof.

13. The method as claimed in claim 10 further comprising generating one or more analytical report representing the comparative analyses.

14. The method as claimed in claim 10 further comprising transmitting an alert with respect to the performed analyses when the one or more web services crosses a prebuilt KPI (Key Performance Indicator).

* * * * *